United States Patent
Chandolu et al.

(10) Patent No.: US 10,324,796 B2
(45) Date of Patent: Jun. 18, 2019

(54) STACK DETAIL RECOVERY

(71) Applicant: International Business Machines Corporation, Armonk, NY (US)

(72) Inventors: Uma Maheswara R. Chandolu, Hyderabad (IN); Saurabh K. Gupta, Bangalore (IN); Keerthi B. Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 15/234,157

(22) Filed: Aug. 11, 2016

(65) Prior Publication Data

US 2018/0046533 A1    Feb. 15, 2018

(51) Int. Cl.
G06F 11/00    (2006.01)
G06F 11/14    (2006.01)
G06F 11/07    (2006.01)

(52) U.S. Cl.
CPC ........ *G06F 11/1417* (2013.01); *G06F 11/073* (2013.01); *G06F 11/0787* (2013.01); *G06F 2201/805* (2013.01)

(58) Field of Classification Search
CPC ............... G06F 11/3476; G06F 11/348; G06F 12/1072; G06F 12/109; G06F 12/1036; G06F 12/10; G06F 12/145; G06F 2212/684
See application file for complete search history.

(56) References Cited

U.S. PATENT DOCUMENTS

| | | | | |
|---|---|---|---|---|
| 4,044,334 A | * | 8/1977 | Bachman | G06F 17/30958 |
| 4,077,058 A | * | 2/1978 | Appell | G06F 9/45533 713/100 |
| 4,177,510 A | * | 12/1979 | Appell | G06F 12/1491 711/163 |
| 4,316,245 A | * | 2/1982 | Luu | G06F 9/52 710/15 |
| 4,318,182 A | * | 3/1982 | Bachman | G06F 9/524 710/240 |
| 4,714,993 A | * | 12/1987 | Livingston | G06F 12/1009 711/206 |
| 5,317,752 A | * | 5/1994 | Jewett | G06F 1/12 714/14 |
| 6,732,355 B1 | * | 5/2004 | Ogasawara | G06F 9/4486 717/128 |

(Continued)

FOREIGN PATENT DOCUMENTS

EP    2787441 A1    10/2014

OTHER PUBLICATIONS

Thompson, "PC Hardware in a Nutshell", Jul. 2003, O'Reilly, 3rd Edition, p. 1-8 (Year: 2003).*

*Primary Examiner* — Bryce P Bonzo
*Assistant Examiner* — Jeison C Arcos
(74) *Attorney, Agent, or Firm* — Edward J. Wixted, III

(57) ABSTRACT

A computer-implemented method, includes, in a pageable operating system environment that does not keep all kernel pages in memory, identifying one or more stack frame pages. The method includes storing the one or more stack frame pages in a logical dump volume, wherein the logical dump volume is accessed upon a system reboot. A corresponding computer system and computer program product are also disclosed.

12 Claims, 3 Drawing Sheets

(56) References Cited

U.S. PATENT DOCUMENTS

| | | | |
|---|---|---|---|
| 7,290,175 B1* | 10/2007 | Kessler | G06F 11/0778 |
| | | | 714/34 |
| 8,880,757 B1* | 11/2014 | Cardona | G06F 11/3065 |
| | | | 710/22 |
| 2003/0120968 A1* | 6/2003 | Andress | G06F 11/0793 |
| | | | 714/25 |
| 2005/0204107 A1* | 9/2005 | Narayan | G06F 11/073 |
| | | | 711/162 |
| 2008/0216073 A1* | 9/2008 | Yates | G06F 9/30174 |
| | | | 718/100 |
| 2009/0031166 A1* | 1/2009 | Kathail | G06F 11/0778 |
| | | | 714/38.1 |
| 2009/0216516 A1* | 8/2009 | St. Onge | G06F 11/3461 |
| | | | 703/21 |
| 2009/0217098 A1* | 8/2009 | Farrell | G06F 11/0712 |
| | | | 714/37 |
| 2013/0152087 A1* | 6/2013 | Hendel | G06F 9/45533 |
| | | | 718/1 |
| 2013/0212425 A1 | 8/2013 | Blaine et al. | |
| 2014/0250335 A1* | 9/2014 | McCoy | G06F 11/079 |
| | | | 714/37 |
| 2016/0232073 A1* | 8/2016 | Cook | G06F 11/348 |

\* cited by examiner

STACK DETAIL RECOVERY

BACKGROUND

The present invention relates generally to the field of data recovery and more particularly to stack detail recovery.

In computing, data recovery is a process of salvaging inaccessible data from corrupted or damaged secondary storage, removable media or files, when the data they store cannot be accessed in a normal way. Data recovery scenarios often involve an operating system failure, malfunction of a storage device, accidental damage, or accidental deletion. Data recovery may also be necessary if a drive-level failure occurs, such as a compromised file system or drive partition.

SUMMARY

A computer-implemented method includes, in a pageable operating system environment that does not keep all kernel pages in memory, identifying one or more stack frame pages. The method includes storing the one or more stack frame pages in a logical dump volume, wherein the logical dump volume is accessed upon a system reboot. A corresponding computer system and computer program product are also disclosed.

DETAILED DESCRIPTION

Figure 1:
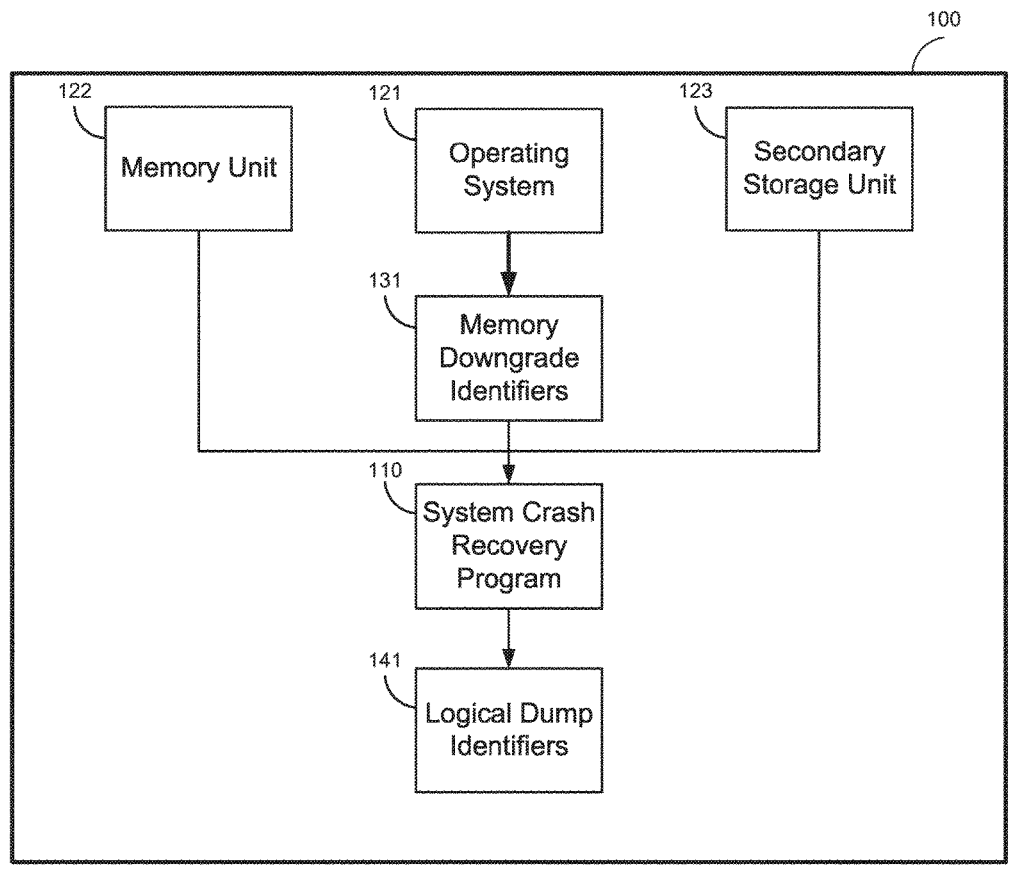
FIG. 1 is a block diagram of an operational environment suitable for operation of a system crash recovery program, in accordance with at least one embodiment of the present invention.

FIG. 1 is a block diagram of the computer system environment 100 suitable for operating a system crash recovery program 110, in accordance with at least one embodiment of the present invention. In the computer system environment 100 depicted in FIG. 1, system crash recovery program 110 interacts with an operating system (OS) 121, a memory unit 122, and a secondary storage unit 123. System crash recovery program 110 receives, from the OS 121, one or more memory downgrade identifiers 131. In at least some embodiments, a memory downgrade identifier 131 is any collection of one or more data artefacts that identifies a stack frame that has been downgraded from (e.g., paged out of) the memory unit 122 to the secondary storage unit 123. In at least some embodiments, the program 110 uses the one or more memory downgrade identifiers 131 to determine one or more logical dump identifiers 141. In at least some embodiments, a logical dump identifier 141 is any collection of one or more data artefacts that indicates that at least one memory downgrade identifier 131 is stored in a designated (contiguous or non-contiguous) segment of the secondary storage unit 123 known as the dump logical volume.

Figure 2:
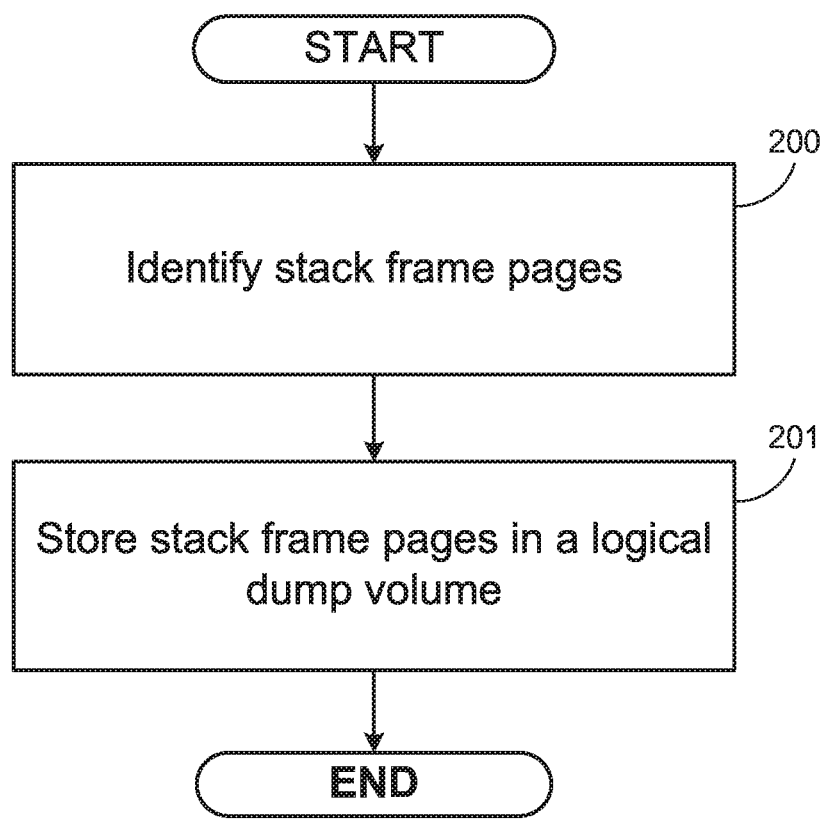
FIG. 2 is a flowchart depicting operational steps for a system crash recovery program, in accordance with at least one embodiment of the present invention.

FIG. 2 is a flow-chart diagram of a system crash recovery program, in accordance with at least one embodiment of the present invention. The embodiment depicted in FIG. 2 operates in a pageable operating system environment that does not keep all kernel pages in memory. At step 200, the program identifies one or more stack frame pages. At step 201, the program stores the one or more stack frame pages in a logical dump volume, wherein the logical dump volume is accessed upon a system reboot.

In some embodiments, the system crash recovery program, operating in a pageable operating system environment that does not keep all kernel pages in memory, identifies one or more stack frame pages and determines that the one or more stack frame pages are stored in a logical dump volume. In at least some embodiments, a system reboot is any restart of a computer system, whether intentionally or unintentionally.

In some embodiments, identifying the one or more stack frame pages comprises mapping said one or more stack frame pages via a non-volatile random-access memory mapping table. In at least some embodiments, a non-volatile random-access memory mapping table is a table stored in a non-volatile random-access memory that includes at least one reference to at least one stack frame page stored in the logical dump volume. In at least some embodiments, each of the one or more stack frame pages is associated with an effective address, wherein each effective address comprises an effective segment identifier. In at least some embodiments, the effective address associated with a stack frame page is the address of the stack frame page in the storage unit in which the logical dump volume is located (i.e., the secondary storage unit). In at least some embodiments, the effective segment identifier associated with a stack frame page is an identification of which segment in the secondary storage unit the stack frame page is located at.

In some embodiments, the system crash recovery program further comprises converting each effective segment identifier to a virtual segment identifier; receiving segment control block information from each virtual segment identifier; and receiving a paging device table. In at least some embodiments, a virtual segment identifier associated with a stack frame page is an identification of the location of the stack frame page absent any downgrading from the memory unit to the secondary storage unit. In at least some embodiments, a virtual segment identifier associated with a stack frame is an indication of the location of the stack frame page assuming contiguity between the memory unit and the secondary storage unit. In at least some embodiments, a virtual segment identifier associated with a stack frame is an indication of the location of the stack frame page given unlimited non-volatile memory. In at least some embodiments, a segment control block information associated with a stack fame page is any indication of the relationship between the stack frame page and other stack frame pages in the memory or the secondary storage unit. In at least some embodiments, a paging device table is any indication of at least one stack frame page that has been downgraded from the memory unit to the secondary storage unit. In at least some embodiments, each of the one or more stack frame pages are associated with a stack frame size identifier (i.e., any indication of the size of the stack frame page).

Embodiments of the present invention enable faster recovery of paged-out frame pages in the events of a system crash through references maintained in a table in a memory unit. Nevertheless, the aforementioned advantages are not required to be present in all of the embodiments of the invention and may not be present in all of the embodiments of the invention.

Figure 3:
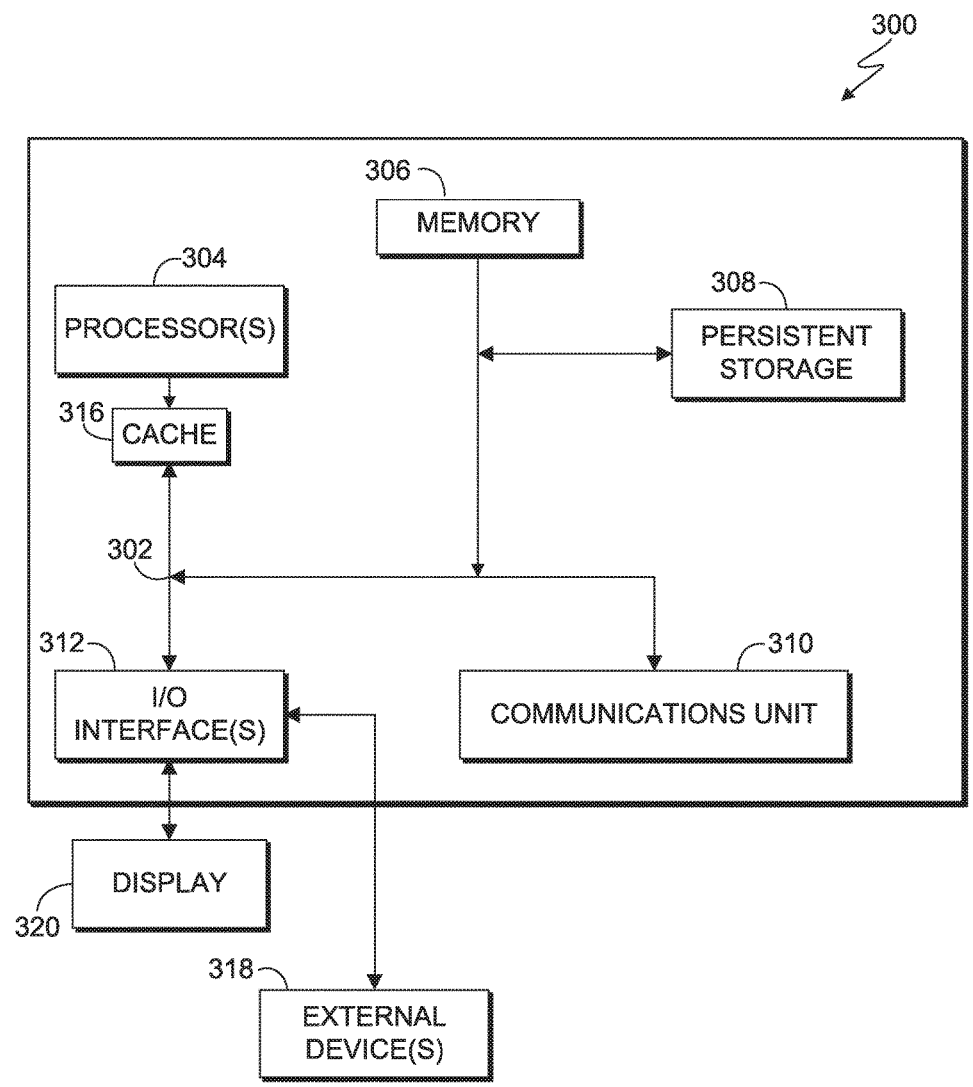
FIG. 3 is a block diagram of components of an operational apparatus suitable for executing a system crash recovery program, in accordance with at least one embodiment of the present invention.

FIG. 3 is a block diagram depicting components of a computer 300 suitable for executing the system crash recovery program 110. FIG. 3 displays the computer 300, the one or more processor(s) 304 (including one or more computer processors), the communications fabric 302, the memory 306, the RAM 316, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the system crash recovery program 110 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. The system crash recovery program 110 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising, in a pageable operating system environment that does not keep all kernel pages in memory:
    identifying, by one or more processors, one or more stack frame pages, wherein said one or more stack frame pages are associated with an effective address, each said effective address comprising an effective segment identifier;
    storing, by one or more processors, said one or more stack frame pages in a logical dump volume;
    receiving a memory downgrade identifier;
    storing the memory downgrade identifier in a designated segment of the logical dump volume; and
    subsequent to a system reboot, accessing, by one or more processors, said logical dump volume, based at least in part on the memory downgrade identifier.

2. The computer-implemented method of claim 1, wherein identifying said one or more stack frame pages comprises mapping said one or more stack frame pages via a non-volatile random-access memory mapping table.

3. The computer-implemented method of claim 1, further comprising:
    converting each said effective segment identifier to a virtual segment identifier;
    receiving segment control block information from each said virtual segment identifier; and
    receiving a paging device table.

4. The computer-implemented method of claim 1, wherein each of one or more stack frame pages are associated with a stack frame size identifier.

5. A computer program product comprising:
    one or more computer readable storage media and program instructions stored on said one or more computer readable storage media, said program instructions comprising instructions to:
    identify one or more stack frame pages, wherein said one or more stack frame pages are associated with an effective address, each said effective address comprising an effective segment identifier;
    store said one or more stack frame pages in a logical dump volume;
    receive a memory downgrade identifier;
    store the memory downgrade identifier in a designated segment of the logical dump volume; and
    subsequent to a system reboot, access said logical dump volume, based at least in part on the memory downgrade identifier.

6. The computer program product of claim 5, wherein instructions to identify said one or more stack frame pages comprises instructions to map said one or more stack frame pages via a non-volatile random-access memory mapping table.

7. The computer program product of claim 5, further comprising instructions to:
   convert each said effective segment identifier to a virtual segment identifier;
   receive segment control block information from each said virtual segment identifier; and
   receive a paging device table.

8. The computer program product of claim 5, wherein each of said one or more stack frame pages are associated with a stack frame size identifier.

9. A computer system comprising:
   one or more computer processors;
   one or more computer readable storage media;
   computer program instructions; and
   said computer program instructions being stored on said computer readable storage media for execution by at least one of said one or more processors, said computer program instructions comprising instructions to:
      identify one or more stack frame pages, wherein said one or more stack frame pages are associated with an effective address, each said effective address comprising an effective segment identifier;
      store said one or more stack frame pages in a logical dump volume;
      receive a memory downgrade identifier;
      store the memory downgrade identifier in a designated segment of the logical dump volume; and
      subsequent to a system reboot, access said logical dump volume, based at least in part on the memory downgrade identifier.

10. The computer system of claim 9, wherein instructions to identify said one or more stack frame pages comprises instructions to map said one or more stack frame pages via a non-volatile random-access memory mapping table.

11. The computer system of claim 9, further comprising instructions to:
    convert each said effective segment identifier to a virtual segment identifier;
    receive segment control block information from each said virtual segment identifier; and
    receive a paging device table.

12. The computer system of claim 9, wherein each of said one or more stack frame pages are associated with a stack frame size identifier.

\* \* \* \* \*